Sept. 15, 1931. J. M. CHRISTMAN 1,823,727
MACHINE TOOL
Filed May 14, 1929

Inventor
JOHN M. CHRISTMAN
By  Milton Tibbetts
Attorney

Patented Sept. 15, 1931

1,823,727

UNITED STATES PATENT OFFICE

JOHN M. CHRISTMAN, OF DETROIT, MICHIGAN, ASSIGNOR TO PACKARD MOTOR CAR COMPANY, OF DETROIT, MICHIGAN, A CORPORATION OF MICHIGAN

MACHINE TOOL

Application filed May 14, 1929. Serial No. 362,961.

This invention relates to machine tools and particularly to lathes. The machine of this invention is particularly designed for machining cams on cam shafts or crank cheeks on crank shafts, and work of this sort.

The salient object of the invention is the simplification of the mechanism necessary for machining cam shafts and similar shafts.

It is also an object of the invention to provide a lathe mechanism of rugged construction to perform its work without chatter and to thereby produce a well finished machined surface.

Another object of the invention is to provide a lathe of this character in which the cutting tool will have long life and consequently will require replacement or sharpening less often.

Other objects of the invention will appear from the following description taken in connection with the drawings, which form a part of this specification and in which.

Figure 1:
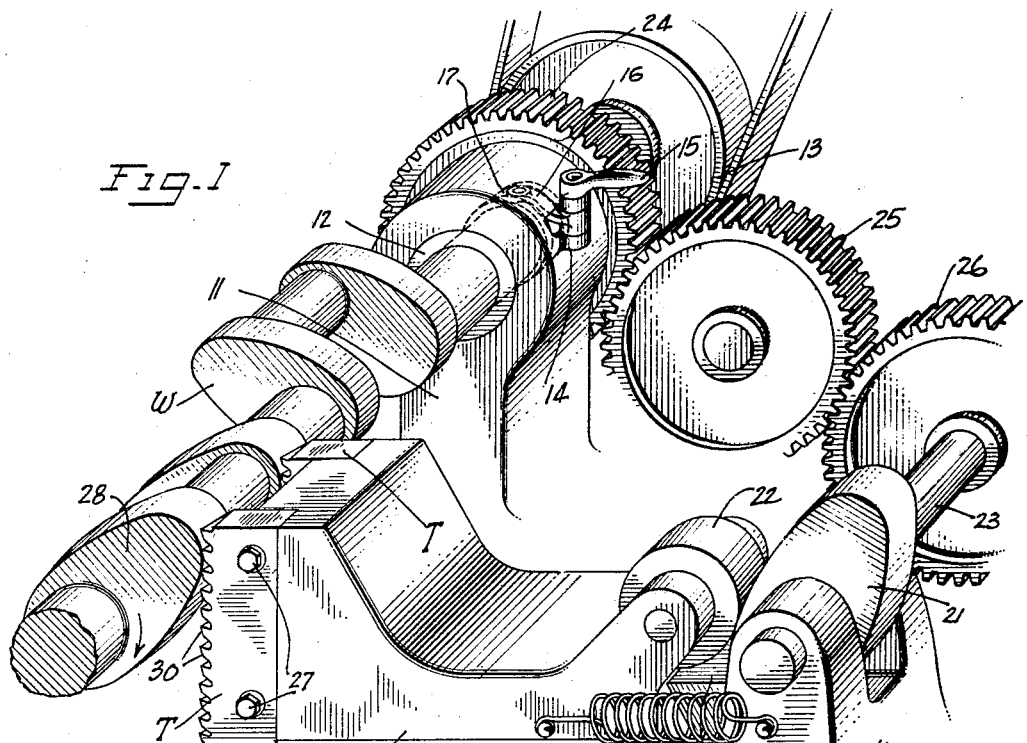
Fig. 1 is a perspective view of a lathe embodying the invention.

Referring to the drawings, the base or standard of the machine is indicated at 10 and an integral upright 11 thereof supports a rotary work holder 12 which may be driven by a belt and pulley 13 in the usual way. The work W, in this case a crank shaft, is secured to the work holder 12 and it will be understood that its other end is mounted in a similar support. Also, conventionally illustrated, is a feeding mechanism 14 which may be either automatic or hand operated, and in the form shown a handle 15 moves a yoke 16, shown in dotted lines, operating in a groove 17 in the work holder 12, and thus the operator may feed the work holder 12 and consequently the work W, axially of the latter, that is in the direction of axis of rotation of the work, for the purpose of progressively presenting the work to the tools.

A tool holder or carriage 18 is mounted to move toward and from the work in a line normal to the axis of the rotating crank shaft W. As shown, this movement is one of reciprocation and the tool holder 18 is mounted on a slide 19 supported on the base 10 of the machine. A spring 20 yieldingly draws the tool holder toward the right and a cam 21 moves it toward the left or toward the work. The cam 21 operates against a roller 22 mounted on the tool holder, and the cam is secured to a shaft 23 which is synchronously driven with the work holder 12 as by a gear 24 on the work holder 12, an idler gear 25, and a gear 26 upon the shaft 23. Thus the tool holder is reciprocated at least once with each revolution of the work holder and in synchronism therewith.

The cutter or tool T is mounted on the forward end of the tool holder 18. As shown, it is rigidly secured thereto as by bolts 27. In fact, in the form shown, there are two of such tools spaced apart the same distance as two of the cheeks on the crank shaft. These cheeks are indicated at 28 and it will be noticed that they are oval in form or of irregular shape and the cam 21 is shaped to move the tool holder 18, in synchronism with the rotation of the crank shaft, to produce the desired cutting result.

Each of the tools T is formed with a plurality of cutting points or cutting edges 30, these points being slightly spaced apart, and, as shown in Fig. 1, arranged in a right line. This line of points or cutting edges is tangent to the rotating work, that is, the tool T is so mounted on the holder 18 that a line through the cutting points would be a tangent to a circle drawn about the axis of the rotating work. Also it may be said to have its teeth in a line substantially normal to the line of reciprocation of the holder. The tool extends sufficiently in both directions from its neutral zone so that all times in the rotation of the work at least one of the tool points will be operating on the surface of the cam or crank cheek. As shown, the crank shaft is rotated about the substantially horizontal axis and the tool is vertically arranged at one side of the shaft with its row of teeth in cutting relation to the work.

In operation, the work is rotated, and in synchronism therewith the shaft 23 is rotated and consequently the cam 21 reciprocates the tool holder 18 so that the tool closely follows the periphery of the cheek 28. As the machine is in operation the operator, by means of the feed device 14, reciprocates the work and thereby feeds it to the tool. Thus the tool traverses the periphery of the cheek 28 and takes whatever depth of cut the machine has been set to.

In cutting crank cheeks such as shown in Fig. 1, where there are two similar adjacent cheeks, two similar tools may operate simultaneously upon these adjacent cheeks, being mounted for this purpose on a single tool holder.

It will be understood that there may be as many tool holders and cam operating means therefor as there are crank cheeks or, in the case of cam shafts, as there are cams.

Figures 2, 3, 4:
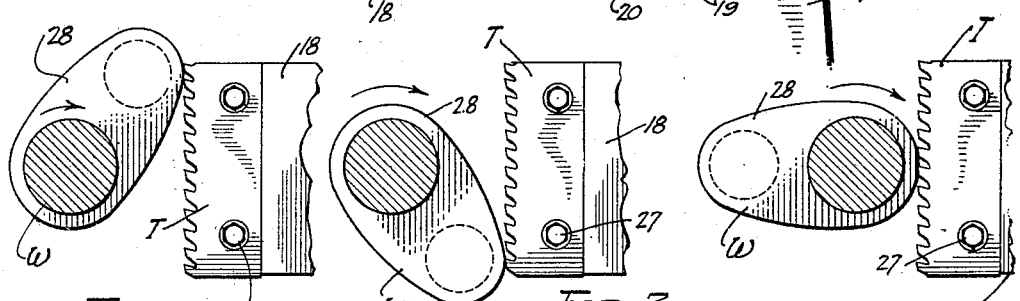
Figs. 2, 3 and 4 are elevations of the cutter in its relation to the work in several positions of the latter.

In the rotation of the work relative to the tool the upper teeth of the tool will be cutting at one stage of the operation as shown in Fig. 2, the lower teeth will be cutting at another stage as shown in Fig. 3, and the intermediate teeth will be cutting at another time as shown in Fig. 4, the teeth engaging the work in sequence. At all times the angle of the cutting edge of the tool is substantially correct for the best cutting action, and yet there is no other movement of the tool or tool holder except the single reciprocating movement.

With this multiple pointed tool and with the various points operating at different times on the work, there is a distribution of the cutting action and consequently the tool will last much longer than would a tool having a single point, and thus the tools will not have to be changed or sharpened as often as a single point tool.

If desired, one of the tools T, shown in Fig. 1, may take a coarse cut and the other tool may take a fine cut, thus accomplishing in a single operation both rough and fine cutting.

Figures 5, 6:
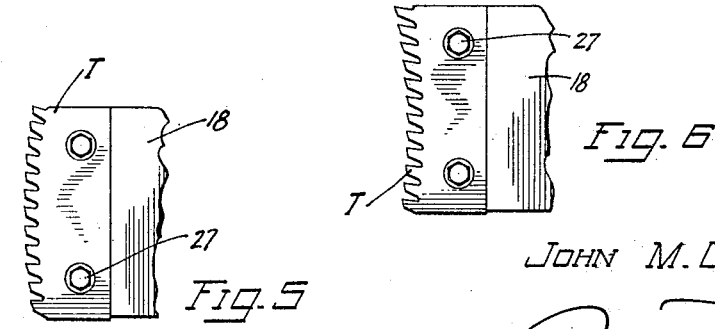
Figs. 5 and 6 illustrate modified forms of cutters or tools.

In Figs. 5 and 6 are shown slightly modified forms of cutting tools. For some cutting purposes it may be desirable to arrange the cutting points in a slight outward curve as shown in Fig. 5, and in some other cases a concave line of cutting teeth may be employed.

The form of the cutter and the shape of the cam 21 will be determined by the form of cam or cheek to be cut.

The simplicity of the invention is apparent. The tool itself by reason of its multiple teeth may be relatively large and strong and it may be and is mounted upon a rigid tool holder which has but a single movement, that is of reciprocation to and from the work. This single movement of the tool, in synchronism of course with the rotation of the work, permits the most rigid construction of parts and the most accurate machining of the work.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a lathe, the combination with a work holder and means for rotating it, of a tool holder mounted to move substantially in a right line toward and from the work and substantially normal to the work rotating axis, means for causing reciprocating movement of the tool holder synchronously with each revolution of the work holder, and a tool mounted on the tool holder and having plural cutting points arranged in line substantially normal to the line of reciprocation of the holder.

2. In a lathe, the combination with a work holder and means for rotating it, of a tool holder mounted to move substantially in a right line toward and from the work and substantially normal to the work rotating axis, means for causing reciprocating movement of the tool holder synchronously with each revolution of the work holder, and a tool mounted on the tool holder and having spaced cutting points arranged in line substantially normal to the line of reciprocation of the holder, there being enough such points to produce continuous cutting throughout complete rotation of the work.

3. In a lathe, the combination with a work holder and means for rotating it, of a tool holder, means to move the tool holder toward and from the work in a line approximately normal to the rotating axis of the work, and synchronously with each revolution thereof, and two tools mounted in parallel on the tool holder and each having plural cutting points arranged substantially normal to the line of reciprocation of the holder.

4. In a lathe, the combination with a work holder and means for rotating it, of a tool holder, means to move the tool holder toward and from the work in a line approximately normal to the rotating axis of the work and synchronously with each revolution thereof, and two tools mounted on the tool holder to follow each other as the work is fed past them, each of said tools comprising multiple cutting points arranged substantially normal to the line of reciprocation of the holder.

5. In a lathe, the combination with a work holder and means for rotating it, of a tool having cutting teeth arranged in a line tangent to the rotating work, and means for synchronously reciprocating the tool, with each revolution of the work, in a line normal to the axis of rotation of the work and substantially normal to the line of tangency of the tool.

6. In a lathe, the combination with a work holder and means for rotating it, of a tool having cutting teeth arranged in a line tangent to the rotating work, means for synchronously reciprocating the tool, with each revolution of the work, in a line normal to the axis of rotation of the work and substantially normal to the line of tangency of the tool, and means for feeding the work relative to the tool.

7. In a lathe, the combination with a horizontally mounted rotating work holder, of a tool having several cutting points arranged vertically at one side of the work holder, means for synchronously reciprocating the tool horizontally and normal to the work holder with each revolution thereof, and means for feeding the work holder.

8. In a lathe, the combination of a rotating work holder, a tool having several cutting points arranged in a line tangent to the rotating work, means to effect synchronous relative movement between the work holder and the tool with each revolution of the work in a line normal to the axis of rotation of the work and substantially normal to the line of tangency of the tool, and means to effect a relative feed of work and tool.

9. In a lathe, the combination of a rotating work holder, a tool holder, means to effect synchronous reciprocating movement of the tool holder toward and from the work with each revolution of the work, and a tool rigidly supported on the tool holder having multiple teeth arranged in an arc tangent to the work, the general line of the teeth being normal to the line of reciprocation of the holder.

10. In a lathe, the combination of a rotating work holder, a tool holder, means to effect synchronous reciprocating movement of the tool holder toward and from the work, and a tool rigidly supported on the tool holder having multiple teeth arranged in an arc tangent to the work, the general line of the teeth being normal to the line of reciprocation of the holder and the convexity of the arc being presented toward the work.

11. In a lathe, the combination of a rotating work holder, a tool holder, means to effect synchronous reciprocating movement of the tool holder toward and from the work, and a tool rigidly supported on the tool holder having multiple teeth arranged in an arc tangent to the work, the general line of the teeth being normal to the line of reciprocation of the holder and the concavity of the arc being presented toward the work.

12. In a lathe, the combination with a work holder and means for rotating it, of a tool holder mounted to move substantially in a right line towards and from the work and substantially normal to the work rotating axis, means for moving the tool holder in synchonism with the rotation of the work holder, and a tool mounted on the tool holder having plural cutting points so arranged as to engage the rotating work in the same sequence upon each revolution of the work to form an irregular surface thereon.

13. In a lathe, the combination with a work holder and means for rotating it, of a tool holder movable relative to the axis of rotation of said work holder, a plural pointed tool mounted on said tool holder, the said tool points being so arranged and the holder being so moved that the teeth of the tool engage rotating work in the same sequence upon each revolution of the said work to form an irregular surface thereon.

14. In a lathe for machining cams or the like, the combination of a rotary work holder, a tool having a plurality of cutting teeth arranged substantially in line and tangential to the work, a holder for said tool, and means for reciprocating the holder and tool in timed relation to the rotation of the work in a path normal to the line of said teeth whereby the different teeth of the tool engage the work in predetermined sequence in each revolution of the work, one tooth cutting on the work nearest the axis of rotation thereof and teeth on either side of said tooth cutting on the work at points more remote from said axle, whereby an irregular shape is formed.

15. In a lathe, the combination with a work holder and means for rotating it, of a tool holder mounted to move toward and from the work and substantially normal to the work rotating axis, pattern means moving in synchronism with the work holder for operating the tool holder, and a tool mounted on the tool holder and having plural cutting points arranged in line substantially normal to the line of reciprocation of the tool holder.

16. In a lathe, the combination with a work holder and means for rotating it, of a tool holder mounted to move toward and from the work and substantially normal to the work rotating axis, pattern means moving in synchronism with the work holder for reciprocating the tool holder at least once with each revolution of the work holder, and a tool mounted on the tool holder and having plural cutting points arranged in line substantially normal to the line of reciprocation of the tool holder.

In testimony whereof I affix my signature.

JOHN M. CHRISTMAN.